US009714841B2

(12) United States Patent
Toda et al.

(10) Patent No.: US 9,714,841 B2
(45) Date of Patent: Jul. 25, 2017

(54) SATELLITE NAVIGATION/DEAD-RECKONING NAVIGATION INTEGRATED POSITIONING DEVICE

(71) Applicant: FURUNO Electric Co., Ltd., Nishinoimiya, Hyogo-Pref. (JP)

(72) Inventors: Hiroyuki Toda, The Presidio of San Francisco, CA (US); Masaki Suyama, Nishinoimiya (JP); Hiroshi Hamada, Nishinoimiya (JP); Mika Tanaka (Ninomiya), Nishinoimiya (JP); Kunihiko Hashimoto, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 0 days.

(21) Appl. No.: 13/848,565

(22) Filed: Mar. 21, 2013

(65) Prior Publication Data
US 2013/0311085 A1    Nov. 21, 2013

Related U.S. Application Data

(63) Continuation of application No. 12/867,271, filed as application No. PCT/JP2009/050743 on Jan. 20, 2009, now abandoned.

(30) Foreign Application Priority Data

Feb. 13, 2008    (JP) ................. 2008-032207

(51) Int. Cl.
*G01C 23/00*    (2006.01)
*G01C 21/28*    (2006.01)
(Continued)

(52) U.S. Cl.
CPC .......... *G01C 23/00* (2013.01); *G01C 21/165* (2013.01); *G01S 19/23* (2013.01); *G01S 19/49* (2013.01); *G01S 19/47* (2013.01)

(58) Field of Classification Search
USPC ................... 342/357, 357.61, 357.03, 357.3
See application file for complete search history.

(56) References Cited

U.S. PATENT DOCUMENTS

| | | | | |
|---|---|---|---|---|
| 5,087,919 A | * | 2/1992 | Odagawa ............... | G01S 19/50 342/357.3 |
| 5,148,179 A | * | 9/1992 | Allison ................... | G01S 19/44 342/357.31 |

(Continued)

FOREIGN PATENT DOCUMENTS

| | | |
|---|---|---|
| EP | 1260831 A1 | 11/2002 |
| JP | 08-050024 | 2/1996 |

(Continued)

OTHER PUBLICATIONS

Google patent search results for EP patent to Edwards Correction Strategy for GPS Receivers (dated Sep. 29, 2015).*

*Primary Examiner* — Jean-Paul Cass
(74) *Attorney, Agent, or Firm* — Global IP Counselors, LLP

(57) ABSTRACT

A satellite and/or dead-reckoning navigation integrated positioning device with improved accuracy including position, velocity, etc. is disclosed. A tracking processing module performs, based on a GPS signal, acquisition and tracking thereof and demodulation of a navigation message. A GPS calculation module calculates position, velocity, and the like based on pseudo-range and Doppler frequency observations, and ephemeris data and gives the calculations to output judgment and tracking processing modules. Based on external support information including inertial sensor output, map information or information about differences between (Continued)

map position and measured position, along with the pseudo-range and Doppler observations, an integrated positioning calculation module estimates position, velocity, and the like, and gives the estimates to the output judgment module. The output judgment module compares outputs of the GPS calculation and the integrated positioning calculation modules to judge reliability of data from the integrated positioning calculation module and abnormality of external support data.

17 Claims, 6 Drawing Sheets

(51) Int. Cl.
*G01S 19/47* (2010.01)
*G08G 1/0969* (2006.01)
*G01C 21/16* (2006.01)
*G01S 19/23* (2010.01)
*G01S 19/49* (2010.01)

(56) References Cited

U.S. PATENT DOCUMENTS

| | | | | |
|---|---|---|---|---|
| 5,179,519 A * | 1/1993 | Adachi | | G01C 21/367 340/990 |
| 5,686,925 A * | 11/1997 | Maeda | | G01S 19/52 342/104 |
| 5,740,048 A * | 4/1998 | Abel | | G01C 21/165 701/470 |
| 5,906,655 A | 5/1999 | Fan | | |
| 6,167,347 A | 12/2000 | Lin | | |
| 6,240,367 B1 | 5/2001 | Lin | | |
| 6,246,960 B1 | 6/2001 | Lin | | |
| 6,292,750 B1 | 9/2001 | Lin | | |
| 6,311,129 B1 * | 10/2001 | Lin | | G09B 9/08 342/422 |
| 6,408,245 B1 * | 6/2002 | An | | G01C 21/165 340/450 |
| 6,480,152 B2 | 11/2002 | Lin et al. | | |
| 6,643,587 B2 | 11/2003 | Brodie et al. | | |
| 6,650,285 B2 * | 11/2003 | Jandrell | | G01S 19/29 342/357.64 |
| 6,697,736 B2 | 2/2004 | Lin | | |
| 6,791,456 B2 * | 9/2004 | Nakayama | | B60R 25/102 340/426.3 |
| 8,149,163 B2 * | 4/2012 | Toda | | G01C 21/165 342/357.3 |
| 2002/0103610 A1 * | 8/2002 | Bachmann | | A61B 5/1114 702/94 |
| 2005/0004748 A1 * | 1/2005 | Pinto | | G01C 21/165 701/470 |
| 2005/0186966 A1 * | 8/2005 | Belcea | | G01S 5/0252 455/456.1 |
| 2007/0037588 A1 * | 2/2007 | Mohi | | G01C 21/20 455/456.5 |
| 2007/0236388 A1 * | 10/2007 | Fiedelak | | G01S 19/07 342/357.44 |
| 2008/0319667 A1 * | 12/2008 | Hawkinson | | G01C 25/005 701/507 |
| 2011/0178708 A1 * | 7/2011 | Zhang | | G01C 21/165 701/501 |
| 2013/0158928 A1 * | 6/2013 | Hogdal | | G01C 21/20 702/104 |
| 2013/0247117 A1 * | 9/2013 | Yamada | | G08C 17/02 725/93 |
| 2016/0091317 A1 * | 3/2016 | Friend | | G01C 21/165 701/500 |

FOREIGN PATENT DOCUMENTS

| | | |
|---|---|---|
| JP | 8-50024 A | 2/1996 |
| JP | 9-152342 A | 6/1997 |
| JP | 2001-108735 A | 4/2001 |
| JP | 2001-341664 A | 12/2001 |
| JP | 2007-073827 | 3/2007 |
| JP | 2007-93483 A | 4/2007 |
| JP | 2007-218868 A | 8/2007 |

* cited by examiner

SATELLITE NAVIGATION/DEAD-RECKONING NAVIGATION INTEGRATED POSITIONING DEVICE

This application is a Continuation of copending application Ser. No. 12/867,271 filed on Aug. 31, 2010, which claims benefit to PCT Application No. PCT/JP2009/050743, filed on Jan. 20, 2009, and JP2008-032207 filed in Japan on Feb. 13, 2008. The entire contents of all of the above applications are hereby incorporated by reference.

TECHNICAL FIELD

The present invention relates to a satellite navigation/dead-reckoning navigation integrated positioning device that integrates an observation obtained by receiving a positioning signal from a navigation satellite and an observation obtained from a dead-reckoning navigation device to perform positioning.

BACKGROUND ART

There have been known various configurations in terms of which observation to use for positioning and how to integrate the observations for positioning in a satellite navigation/dead-reckoning navigation integrated positioning device (hereinafter, referred to as "GPS/DR integrated positioning device") in which an observation (hereinafter, referred to as "GPS observation") obtained from a GPS positioning system, for example, as a non-autonomous system, and an observation (hereinafter, referred to as "DR observation") obtained from a dead-reckoning navigation system (DR: dead-reckoning navigation system), as an autonomous system, are integrated (for example, see Patent Documents 1 and 2).

Which type of configuration is employed in order to integrate the GPS observation and the DR observation largely depends on the cost of the device, required accuracy and the like. FIG. 1 is a block diagram of a typical example of the aforementioned integration type.

FIG. 1(A) shows a loosely-coupled approach, and FIG. 1(B) shows a tightly-coupled approach and a deeply-coupled approach.

In FIG. 1(A), a tracking processing module 11 tracks a phase of a GPS positioning signal of a baseband obtained by receiving a signal from a GPS satellite, and finds a position, a velocity, and the like of each satellite. A GPS positioning calculation module 12 finds a position and a velocity at a receiving point based on a pseudo range (PR), a Doppler frequency observation and the position and velocity of each satellite found by the tracking processing module 11. A DR positioning calculation module 13 finds the position and velocity based on external support data of an inertial sensor and the like. Then, an integrated positioning calculation module 14 integrates the GPS observation, such as the position and velocity obtained by the GPS positioning calculation module 12 and the DR observation, such as the position and velocity obtained by the DR positioning calculation module 13 to provide the position and velocity of higher quality to a user.

In FIG. 1(B), a tracking processing module 21 tracks a phase of a GPS positioning signal of a baseband obtained by receiving a signal from a GPS satellite, and finds a position, a velocity, and the like of each satellite. In the case of the tightly-coupled approach, an integrated positioning calculation module 22 integrates a pseudo range and a Doppler frequency obtained by the tracking processing module 21 as the GPS observation and an external support data of the inertial sensor and the like as the DR observation in one integrated positioning calculation module 22 to provide the position and velocity of higher quality to a user.

In the case of the deeply-coupled approach, the integrated positioning calculation module 22 uses a baseband complex signal (I, Q) obtained by the tracking processing module 21 as the GPS observation and an external support data of the inertial sensor as the DR observation to perform an integrated positioning calculation.

Note that the GPS positioning calculation module 12 and the integrated positioning calculation module 14 of the loosely-coupled approach and the integrated positioning calculation module 22 of the tightly/deeply-coupled approach are also referred to as a "navigation filter" in which usually the position and position error, the velocity and velocity error, inertial sensor error and the like are estimated by a Kalman filter, and the estimated respective errors are negatively fed back as a correction amount to a certain portion to be corrected.

In PNDs (Portable Navigation Devices) for personal and vehicle use, which have attracted attention in recent years, lower price and higher accuracy are required. For this reason, as disclosed in Patent Documents 1 and 2, being used is a device which integrates the external support data of a low-price inertial sensor (such as a gyroscope and an acceleration sensor), map data and the like, and the GPS observation using the loosely-coupled approach or the tightly-coupled approach.

Patent Document 1: JP 2007-93483(A)
Patent Document 2: U.S. Pat. No. 6,643,587

DISCLOSURE OF THE INVENTION

Problems to be Solved by the Invention

However, the GPS/DR integrated positioning device of related art, including Patent Documents 1 and 2, has had problems as described below.

(1) In the loosely-coupled approach, the data of the position, velocity, and the like at the receiving point found by the GPS positioning calculation module and the position and velocity found by the DR positioning calculation module are integrated. Thus, in the loosely-coupled approach, until a result of the GPS positioning calculation is obtained, the GPS data cannot be utilized for calculation of the DR positioning. A general method for the GPS positioning needs at least four satellites to find four variables of a three-dimensional position (X, Y, Z) and a time. However, for the reason above, unless signals from four or more satellites can be acquired and tracked, the GPS data cannot be utilized for the DR calculation.

Further, the biggest drawback of the loosely-coupled approach is the error of the position and velocity obtained from the GPS positioning calculation module 12 being colored noise, which does not meet a white noise error condition as an indispensable requirement of a Kalman filter in the integrated positioning calculation module 22.

(2) In the tightly-coupled approach, the pseudo range and Doppler frequency as the GPS observation, and the DR observation are integrated in one integrated positioning calculation module; therefore, detailed knowledge about the GPS is required to design the Kalman filter. Furthermore, compared with the loosely-coupled approach, the integrated positioning calculation module has a very complex design.

Additionally, when an abnormality occurs in an output from the inertial sensor, for example, the position, velocity, attitude or the like (hereinafter, referred to as navigation data) cannot be provided to the user.

(3) In the deeply-coupled approach, a positioning result fed back to the tracking processing module of the GPS positioning signal is affected by an input value (such as map-match data) from the sensor module and the user. For this reason, for example, if the abnormal sensor data is input, the GPS satellite cannot be tracked to make it impossible to detect the abnormality of the sensor using the GPS positioning results.

In this way, a method for detecting an abnormality is very important technology, particularly in the case of using the inertial sensor, which has low reliability, but is low in cost in order to balance the cost with the performance. However, the GPS/DR integrated positioning device of related art, including Patent Documents 1 and 2, cannot determine the abnormality of the output of the positioning calculation module due to the abnormality of the external support data of the inertial sensor and the like.

Consequently, an object of the invention is to provide a satellite navigation/dead-reckoning navigation integrated positioning device which can be constituted by low cost, and in which accuracy of the navigation data including the position and velocity is improved.

Means for Solving the Problems

The satellite navigation/dead-reckoning navigation integrated positioning device of the invention is constituted as below in order to solve the problems.

(1) According to an aspect of the invention, a satellite navigation/dead-reckoning navigation integrated positioning device is configured to include:

a tracking processing module for receiving positioning signals transmitted from navigation satellites to track the positioning signals (phase information of the positioning signals) and finding a pseudo range and Doppler frequency information;

a satellite navigation positioning calculation module for executing a positioning calculation based on the pseudo range and the Doppler frequency information to find a position and a velocity of a moving body;

an integrated positioning calculation module for determining, based on the pseudo range and the Doppler frequency information found by the tracking processing module and external support data (such as data of an inertial sensor and map data), errors of the external support data to correct the external support data, and finding the position and velocity of the moving body; and an abnormality determination module for comparing a result of the positioning calculation by the satellite navigation positioning calculation module with a result of the positioning calculation by the integrated positioning calculation module to determine the abnormality of the external support data.

With the aforementioned configuration, unlike the loosely-coupled approach of related art, even in a state where a satellite navigation positioning calculation is impossible or is not completed, the position and velocity of the moving body can be found based on the pseudo range and Doppler frequency information already observed. Further, if the external support data becomes abnormal and thus the integrated positioning calculation is impossible, a calculation result by the satellite navigation positioning calculation module can be provided to an user.

(2) The external support data may include, for example, data by an inertial sensor, and the abnormality determination module may compare the result of the positioning calculation by the satellite navigation positioning calculation module with the data by the inertial sensor to determine the abnormality of the inertial sensor.

With the aforementioned configuration, the abnormality of the inertial sensor can be detected; therefore, positioning accuracy can be prevented from lowering due to the use of the inertial sensor in an abnormality state.

(3) The external support data may include, for example, map data input information, and the abnormality determination module may compare the result of the positioning calculation by the satellite navigation positioning calculation module with the map data to determine the abnormality of the map data input information.

With the aforementioned configuration, the abnormality of the map data input information can be detected; therefore, positioning accuracy can be prevented from lowering due to the use of the abnormal map data.

(4) The abnormality determination module may compare the result found by the satellite navigation positioning calculation module with the result found by the integrated positioning calculation module to determine the abnormality of the result of the calculation of the integrated positioning calculation module.

With the aforementioned configuration, the abnormality of the external support data used for the integrated positioning calculation or the abnormality of the integrated positioning calculation module can be detected; therefore, the abnormal navigation data can be prevented from being provided to the user.

(5) A module may be provided to output the calculation results by the satellite navigation positioning calculation module to the user if the abnormality determination module determines an abnormality. The user may be informed of the abnormality state along with the calculation result.

With the aforementioned configuration, even if the abnormality state is determined, the calculation result of the satellite navigation positioning calculation module can be obtained. Additionally, if the abnormality state is output to the user, the user can grasp the abnormality state.

(6) The integrated positioning calculation module, when, for example, resuming the positioning calculation from a state where the integrated positioning calculation module is stopped due to the abnormality of the external support data, may resume the integrated positioning calculation using the position and the velocity found by the satellite navigation positioning calculation module as initial values.

This makes it possible for the integrated positioning calculation module to quickly obtain the positioning result when recovering from the down state of the integrated positioning calculation.

(7) The integrated positioning calculation module may execute the positioning calculation based on the pseudo range and the Doppler frequency information by a single difference between satellites found by the tracking processing module.

In this way, if the positioning calculation is performed based on the single difference between satellites, the integrated positioning calculation module does not need to estimate a clock error of a receiver and changes thereof by the Kalman filter. Therefore, not only a computational load of the Kalman filter in the integrated positioning calculation module can be reduced, but also the clock error and a model of the changes thereof do not need to be considered.

Effect of the Invention

According to the aspect of the invention, unlike the loosely-coupled approach of related art, even in a state, for example, where the satellite navigation positioning calculation is impossible or is not completed with the positioning signals from four or more navigation satellites not being received, the position and velocity of the moving body can be obtained based on the pseudo range and Doppler frequency information already observed. Further, in a case where the external support data becomes abnormal and thus the integrated positioning calculation is impossible, the calculation result by the satellite navigation positioning calculation module can be provided to the user.

BEST MODE FOR CARRYING OUT THE INVENTION

Hereinafter, several specific embodiments are described.

First Embodiment

FIG. 2 is a block diagram showing a configuration of a satellite navigation/dead-reckoning navigation integrated positioning device according to a first embodiment.

A GPS receiving circuit 30 converts a positioning signal from a satellite received by a GPS antenna into an intermediate frequency and A/D-converts it to output a so-called baseband GPS positioning signal.

A sensor module 40 is an external device, which includes at least an acceleration sensor, an angular velocity sensor, and a gyroscope inertial sensor, for obtaining orientation information and outputs external support data.

For the external support information other than the value obtained by the above various sensors, used are map position input information (map-match data) or error input information of the map position (map-match data error) input by a user.

A tracking processing module 31 performs, based on the above GPS positioning signal, acquisition processing and tracking processing thereof and demodulation processing of a navigation message including ephemeris data (satellite orbit information), and gives a pseudo-range observation and a Doppler frequency observation to a GPS positioning calculation module 32 and an integrated positioning calculation module 42.

The GPS positioning calculation module 32 calculates the navigation data such as a position, a velocity by a usual method based on the pseudo-range observation, the Doppler frequency observation, the ephemeris data and the like.

Based on the external support information including an output of the inertial sensor (gyroscope and acceleration sensor as needed), the above map information (map-match data) or information about the difference between the map position and a measured position (map-match data error), and the like as needed in addition to the pseudo-range observation and the Doppler frequency observation, the integrated positioning calculation module 42 estimates the position, position error, velocity, velocity error, error of the external support data of the inertial sensor or the like using a known Kalman filter. Then, the integrated positioning calculation module 42 gives the navigation data such as the position, velocity and the like to an output judgment module 43. Moreover, the estimated error of the external support data is fed back to a predetermined processing module as a correction amount.

The navigation data of the GPS positioning calculation module 32 is calculated independent of the integrated positioning calculation module 42. With this configuration, even if an abnormality caused due to the external support data occurs in the navigation data of the integrated positioning calculation module 42, the navigation data of the GPS positioning calculation module 32 is not affected by the abnormality of the external support data, and the navigation data of the GPS positioning calculation module 32 can be used to determine an abnormality of the navigation data of the integrated positioning calculation module 42. That is, in the output judgment module 43, all or any piece of the navigation data calculated by the GPS positioning calculation module 32 can be used as a comparative criterion to determine reliability of the output of the integrated positioning calculation module 42 output to a hardware/software 44 of the user.

Note that the GPS positioning calculation module 32 and the integrated positioning calculation module 42 are provided, along with the pseudo range and Doppler frequency, with the ephemeris data, which has no direct relation therewith in the first embodiment, thus is omitted in the figure.

Next, a method for determining various abnormalities by the output judgment module 43 is described with reference to FIG. 3 to FIG. 5.

FIG. 3 is a flowchart showing a procedure of abnormality determination of the integrated positioning calculation module executed by the output judgment module 43.

The output judgment module 43 compares the output of the GPS positioning calculation module 32 and the output of the integrated positioning calculation module 42 (S11).

In an example shown in FIG. 3, the reliability of the output data of the integrated positioning calculation module 42 is determined by the AND condition of the position determination, velocity determination and attitude determination of the navigation data (S12, S13, S14).

Between the navigation data found respectively by the GPS positioning calculation module 32 and the integrated positioning calculation module 42, if a difference of the positions is equal to or more than a predetermined threshold value, the navigation data found by the GPS positioning calculation module 32 is switched to be output to the hardware/software 44 of the user (S12→S16). Similarly, if a difference of the velocities thereof is equal to or more than a predetermined threshold value, the navigation data found by the GPS positioning calculation module 32 is switched to be output to the hardware/software 44 of the user (S13→S16).

Further, if a difference between the attitude of the moving body found by the GPS positioning calculation module 32 and the attitude of the moving body found by the integrated positioning calculation module 42 is equal to or more than a predetermined threshold value, the navigation data found by the GPS positioning calculation module 32 is switched to be output to the hardware/software 44 of the user (S14→S16). Here, the attitude of the moving body is an orientation which the moving body is directed, and is found, for example, from a position vector at a certain time in a case of being found based on the position information, and is found using a ratio with respect to a horizontal velocity component in a case of being found based on the velocity information.

If the position, velocity and attitude are all less than the predetermined threshold values, the navigation data found by the integrated positioning calculation module 42 is output to the hardware/software 44 of the user.

Note that when the integrated positioning calculation module 42 resumes the positioning calculation, the processing of the integrated positioning calculation module is resumed using the position and velocity found by the GPS positioning calculation module 32 as initial values or the velocity thereof as an initial value.

The reliability of the output data of the integrated positioning calculation module 42 may be determined by a combination of the OR condition of the position determination, velocity determination and attitude determination of the navigation data, or by the AND or OR condition of any two of them and the AND or OR condition of the rest. For example, determination may be performed by a condition of (position AND velocity) OR attitude, or a condition of (position OR velocity) AND attitude.

FIG. 4 is a flowchart showing a procedure of abnormality determination of the external support data executed by the output judgment module 43.

The output judgment module 43 executes the abnormality determination of the external support data using the output of the GPS positioning calculation module 32. For example, the abnormality of the signal of the gyroscope inertial sensor for obtaining the orientation information is determined by calculating an azimuth variation at a predetermined time interval of an azimuth angle calculated based on the velocity of the GPS positioning calculation module 32, at least during movement, and comparing the signal of the gyroscope inertial sensor with the azimuth angle variation amount as a reference (S21→S22). If a difference between them is less than a predetermined threshold value, the navigation data found by the integrated positioning calculation module 42 is output to the hardware/software 44 of the user (S22→S23). If the difference between them is equal to or more than the predetermined threshold value, the signal of the gyroscope inertial sensor is determined to be abnormal, and the navigation data found by the GPS positioning calculation module 32 is switched to be output to the hardware/software 44 of the user (S22→S24).

Note that a program may be defined in a case in which the azimuth variation is equal to or more than a certain value; if the signal of the gyroscope inertial sensor does not change, the output of the gyroscope inertial sensor is determined to be abnormal.

FIG. 5 is a flowchart showing a procedure of abnormality determination of another external support data executed by the output judgment module 43.

The output judgment module 43 calculates a variation amount of the velocity at a predetermined time interval found by the GPS positioning calculation module 32, and, with the velocity variation amount being used as a reference value, compares the reference value with a signal of the acceleration sensor (S31→S32). If a difference between them is less than a predetermined threshold value, the navigation data found by the integrated positioning calculation module 42 is output to the hardware/software 44 of the user (S32→S33). If the difference between them is equal to or more than the predetermined value, the signal of the acceleration sensor is determined to be abnormal and the navigation data found by the GPS positioning calculation module 32 is output to the hardware/software 44 of the user (S32→S34).

Note that the program may be defined in a case in which the velocity variation is equal to or more than the predetermined threshold value set in advance; if the signal of the acceleration sensor does not change, the acceleration sensor is determined to be abnormal.

Similarly, in a case where a velocity sensor is used for the external support data, the abnormality of the signal of the velocity sensor is determined by comparing, with the velocity of the GPS positioning calculation module 32 being as a reference value, the reference value with the signal of the velocity sensor. Further, in a case where the velocity is equal to or more than a predetermined threshold value, if the signal of the velocity sensor does not change, the velocity sensor may be determined to be abnormal.

Further, the abnormality of the map position input information is determined by, with the position found by the GPS positioning calculation module 32 being used as a reference value, comparing the reference value with the map position input information.

Similarly, the abnormality of the error input information of the map position is determined by, with the velocity found by the GPS positioning calculation module 32 or the position variation at a predetermined time interval being as a reference value, comparing the reference value with the error input information of the map position.

The above map position input information is specifically the map position data of, for example, the satellite navigation/dead-reckoning navigation integrated device generated in a car navigation system, and the map position is input as latitude and longitude data.

Additionally, the error input information of the map position is specifically information of a difference between, for example, data of the car navigation system or other position measurement devices and the map position data, and are input as position error information.

Note that in any of the above abnormality determinations, the abnormality of the input data may be determined depending on not only whether or not the difference between the reference value and a value of the target to be determined about abnormality thereof exceeds a predetermined threshold value, but also whether or not the number of cases where the difference exceeds the predetermined threshold value reaches a predetermined number.

Second Embodiment

FIG. 6 is a block diagram showing a configuration of a satellite navigation/dead-reckoning navigation integrated positioning device according to a second embodiment of the invention.

This embodiment is different from the satellite navigation/dead-reckoning navigation integrated positioning device shown in FIG. 2 of the first embodiment in the configuration of the integrated positioning calculation module 53 and a relationship between the integrated positioning calculation module 53 and the GPS positioning calculation module 32.

A satellite position correction value calculation module 51 in the GPS positioning calculation module 32 calculates values concerning satellite position and correction values including a position and a velocity of a satellite, a satellite time correction value, an ionospheric correction value, a tropospheric correction value and the like from information, such as the ephemeris and the positioning results obtained by the positioning calculation module 52. The values themselves have configurations similar to the general GPS receiver. The values calculated by the satellite position/correction value calculation module 51 are used in both the positioning calculation module 52 and the integrated positioning calculation module 53.

In this way, the satellite position/correction amount calculation module 51 is commonly used, and thus, the calculation processing load on the satellite navigation/dead-reckoning navigation integrated positioning device can entirely be reduced. Therefore, processing can be performed with a low velocity CPU, leading to low cost correspondingly.

Note that in the embodiments shown above, the example using GPS for the satellite navigation positioning is shown, but it is similarly applicable to a case of using another satellite navigation positioning system.

BRIEF DESCRIPTION OF THE NUMERALS

Figure 1A:
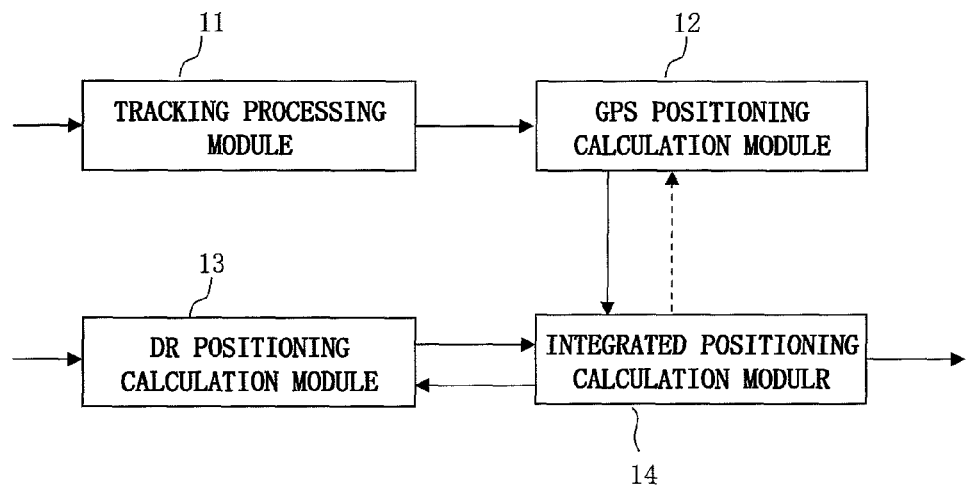
FIGS. 1(A) and 1(B) are block diagrams showing typical configuration examples of an integration type of a satellite navigation/dead-reckoning navigation integrated positioning device of related art.
Figure 1B:
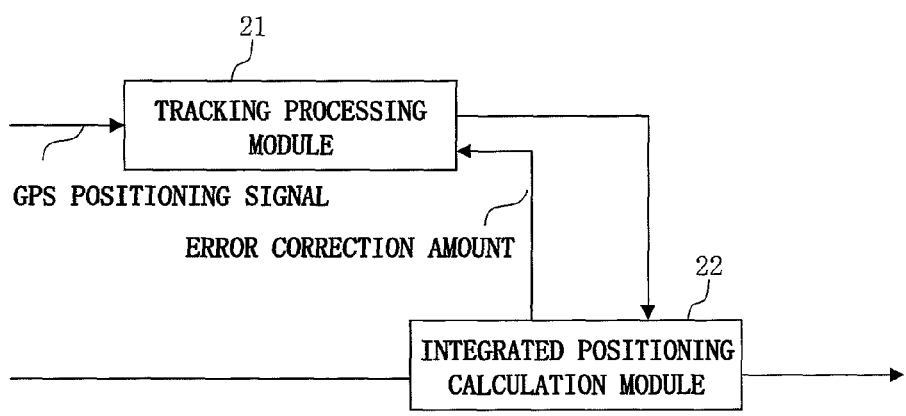
Figure 2:
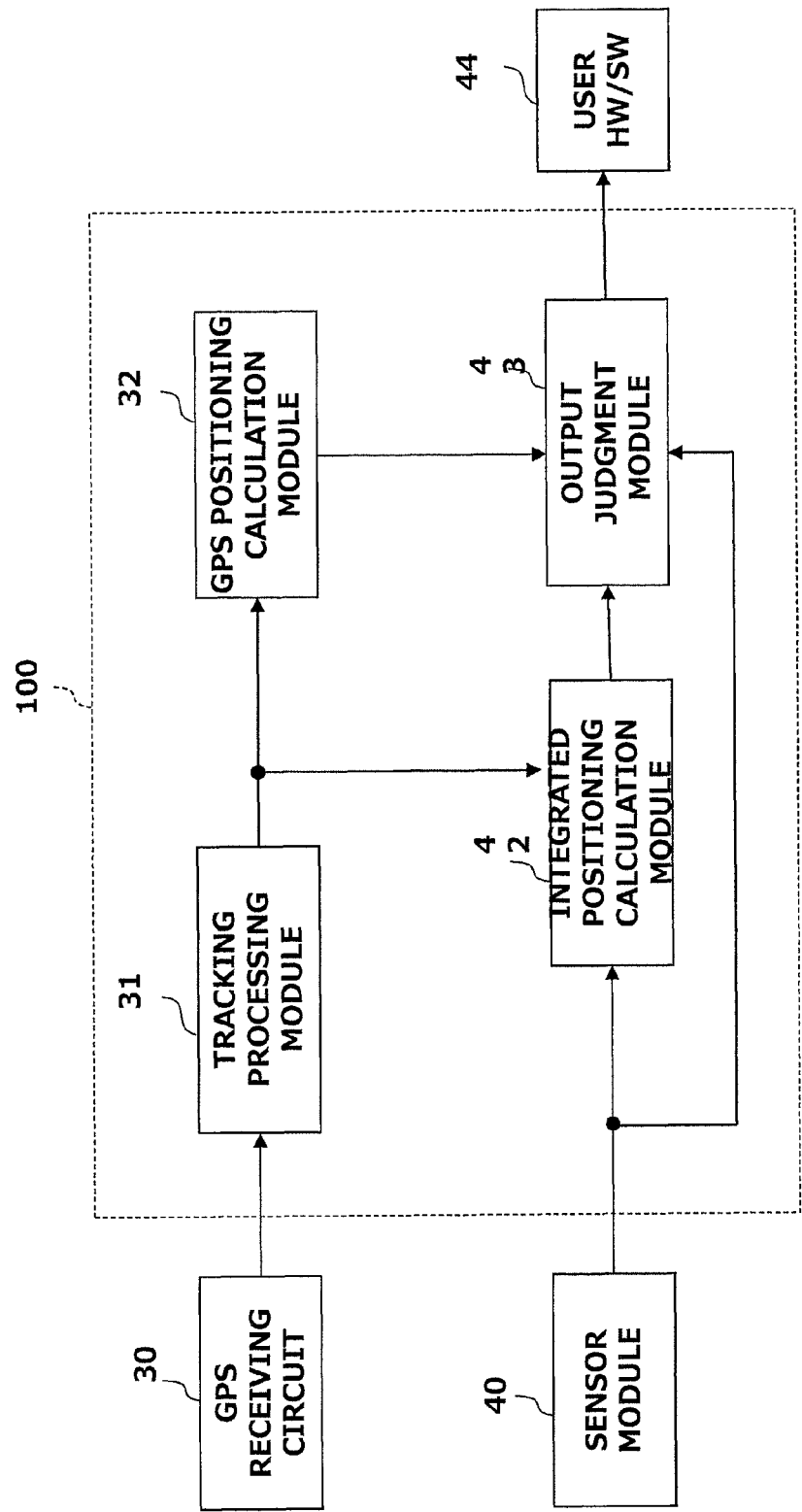
FIG. 2 is a block diagram showing a configuration of a satellite navigation/dead-reckoning navigation integrated positioning device according to a first embodiment.
Figure 3:
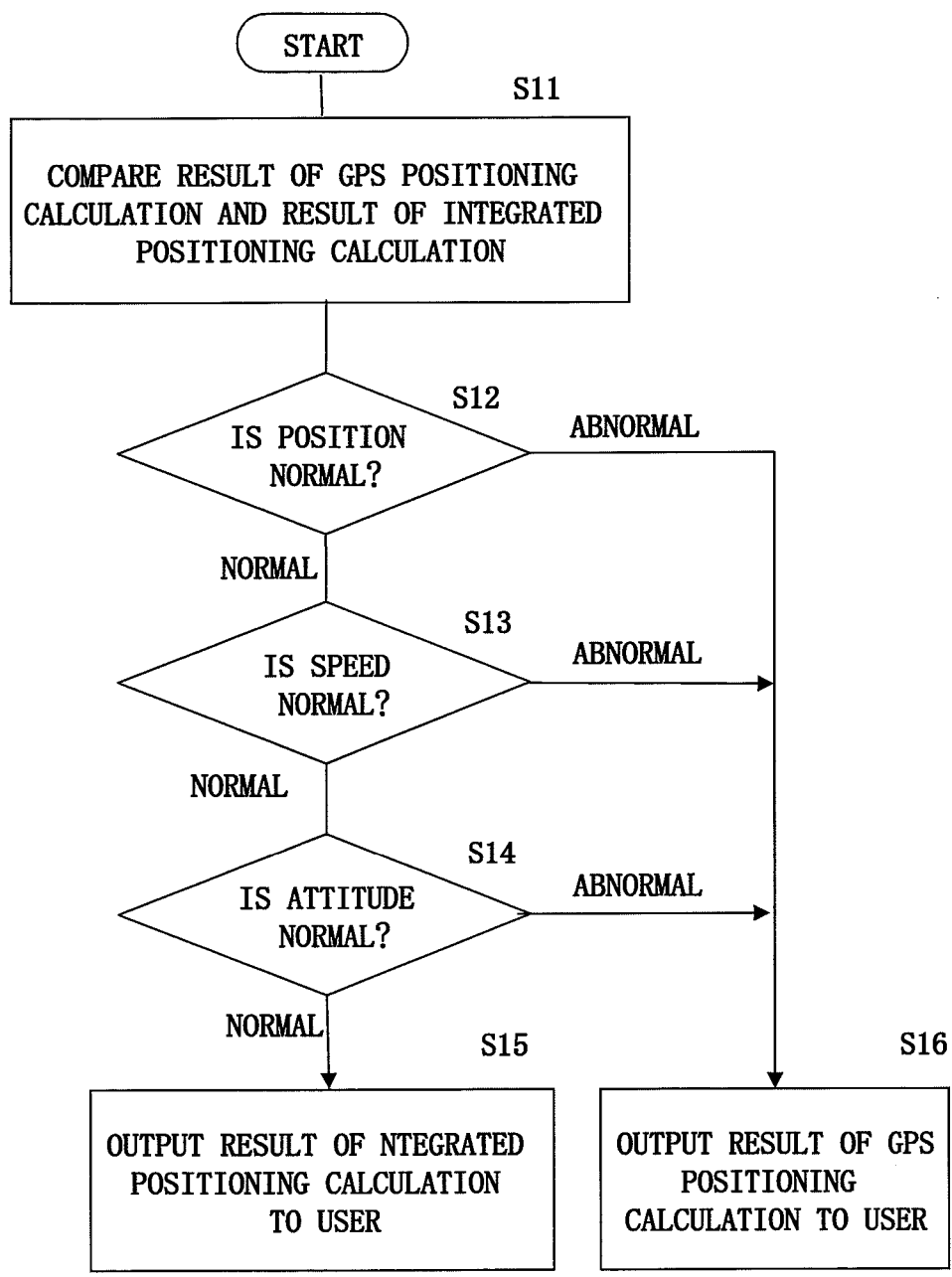
FIG. 3 is a flowchart showing a procedure of abnormality determination of an integrated positioning calculation module executed by an output judgment module of the satellite navigation/dead-reckoning navigation integrated positioning device.
Figure 4:
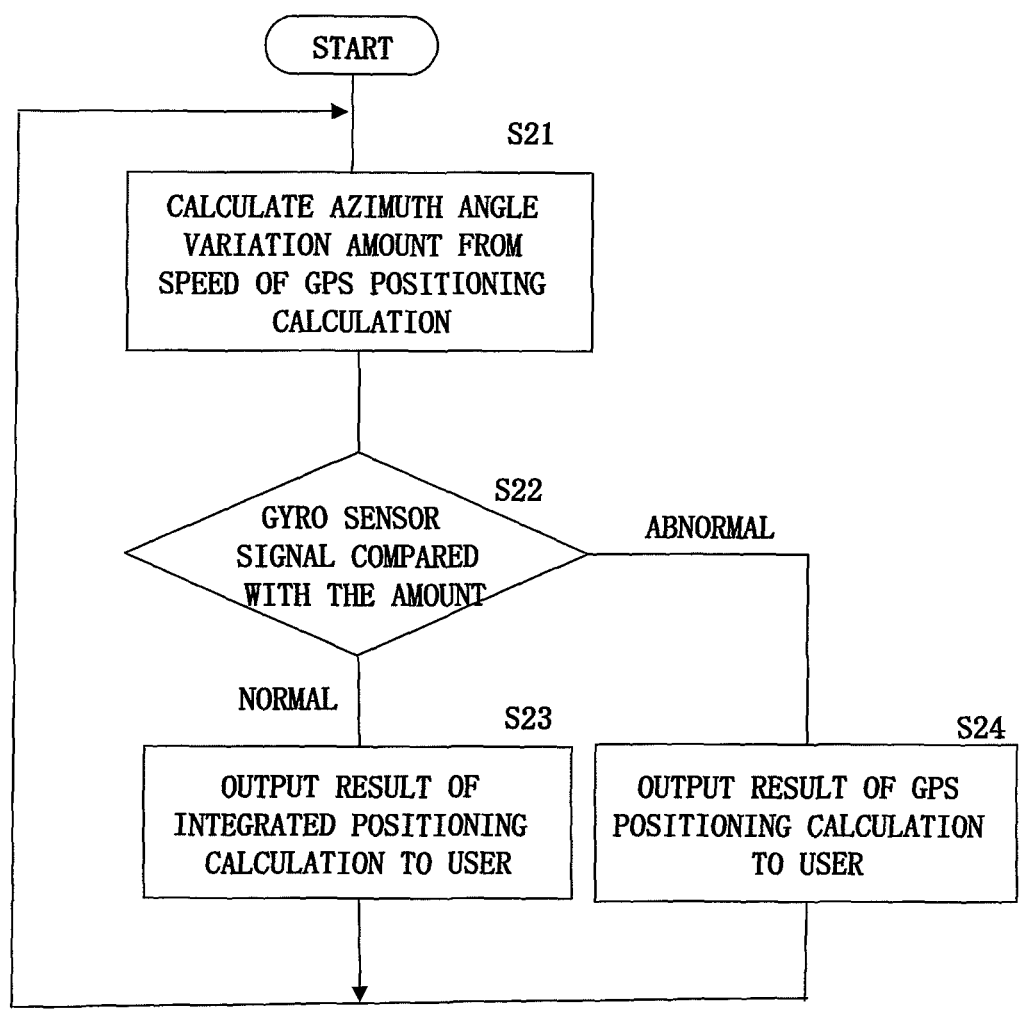
FIG. 4 is a flowchart showing a procedure of abnormality determination of external support data executed by the output judgment module of the satellite navigation/dead-reckoning navigation integrated positioning device.
Figure 5:
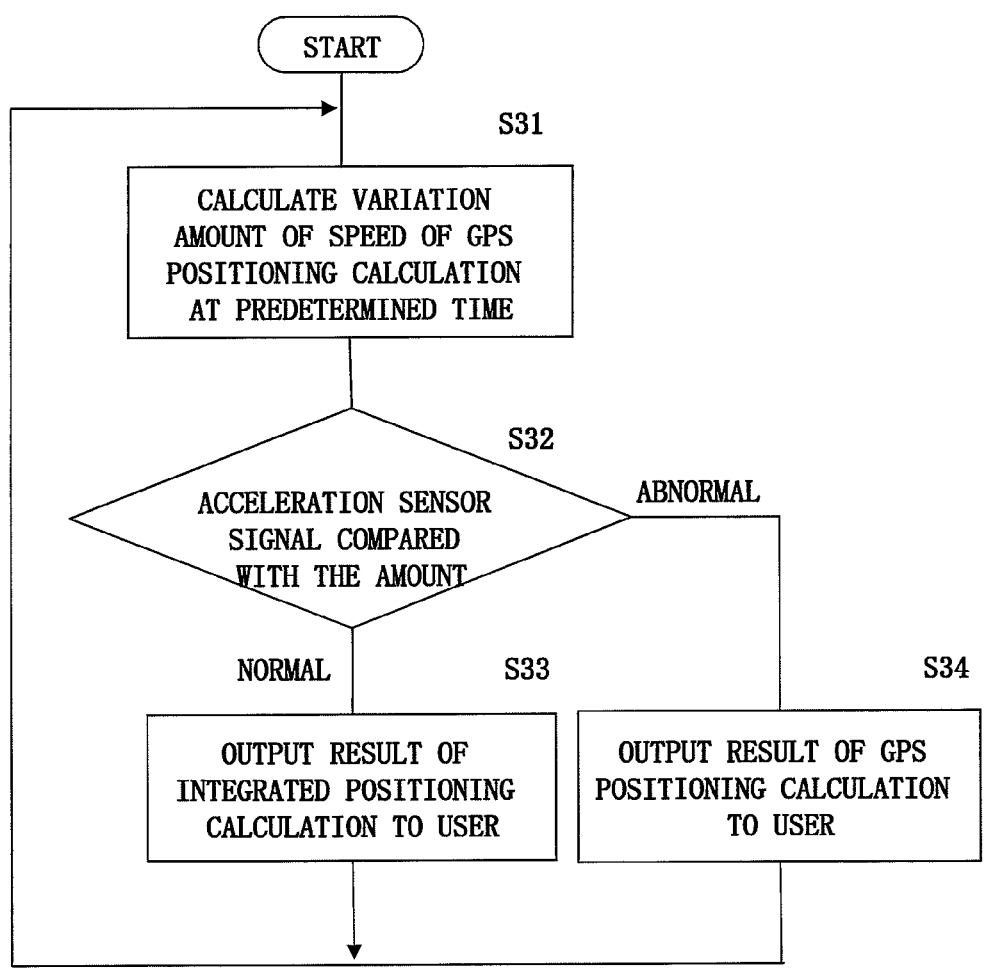
FIG. 5 is a flowchart showing a procedure of abnormality determination of another external support data executed by the output judgment module of the satellite navigation/dead-reckoning navigation integrated positioning device.
Figure 6:
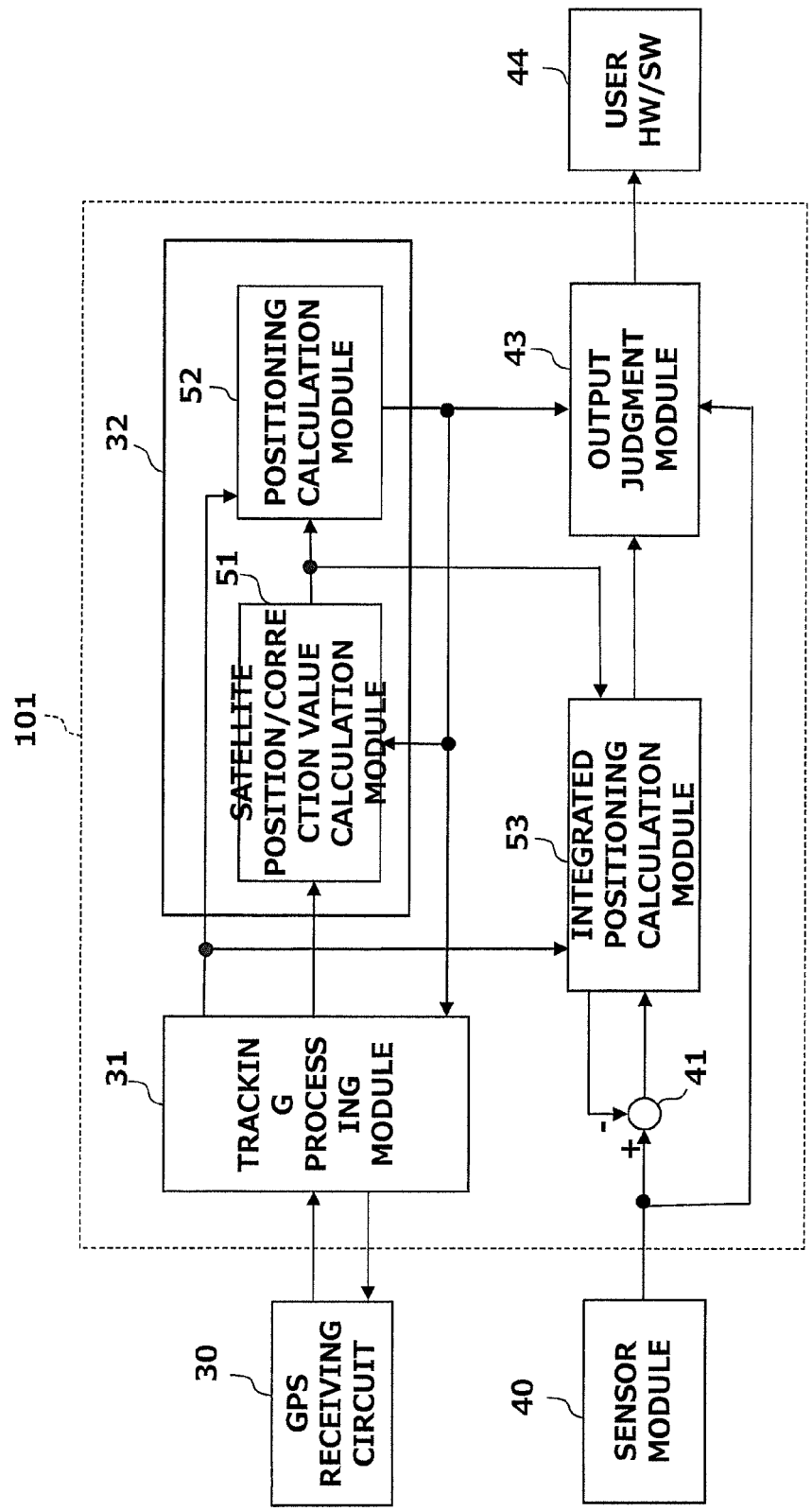
FIG. 6 is a block diagram showing a configuration of a satellite navigation/dead-reckoning navigation integrated positioning device according to a second embodiment.

30 . . . GPS Receiving Circuit; 31 . . . Tracking Processing Module; 32 . . . GPS Positioning Calculation Module; 42 . . . Integrated Positioning Calculation Module; 43 . . . Output Judgment Module; 51 . . . Satellite Position Correction Value Calculation Module; 52 . . . Positioning Calculation Module; 53 . . . Integrated Positioning Calculation Module; and 100, 101 . . . Satellite Navigation/Dead-Reckoning Navigation Integrated Positioning Device.

What is claimed is:

1. A satellite navigation/dead-reckoning navigation integrated positioning device, comprising:
 a tracking processing module configured to receive positioning signals of navigation satellites to track the positioning signals and find a pseudo range and Doppler frequency information;
 a satellite position correction value calculation module configured to calculate correction values pertaining to the navigation satellites;
 an inertial sensor disposed on-board a moving body and configured to provide an output including orientation information pertaining to an orientation of the moving body;
 a satellite navigation positioning calculation module, disposed on-board the moving body, and configured to execute a positioning calculation based on the correction values, the pseudo range and the Doppler frequency information to find a position and a velocity of the moving body without external support data from an external device, and provide a satellite navigation positioning calculation module output including the position and velocity of the moving body;
 an integrated positioning calculation module, disposed on-board the moving body, and configured to find, based on the pseudo range and the Doppler frequency information found by the tracking processing module and the external support data, including at least one of the output from the inertial sensor and map position information, obtained from the external device, and the correction values, a position and a velocity of the moving body and provide an integrated positioning calculation module output indicating the position and velocity of the moving body; and
 an abnormality determination module configured to perform a comparison of the position or velocity in the satellite navigation positioning calculation module output from the satellite navigation positioning calculation module with the position or velocity, respectively, in the integrated positioning calculation module output from the integrated positioning calculation module to determine abnormality of the output from the inertial sensor or the map position information included in the external support data, such that when the comparison indicates a predetermined condition, the abnormality determination module determines abnormality in the integrated positioning calculation module output and provides the satellite navigation positioning calculation module output as an abnormality determination module output, and when the comparison fails to indicate the predetermined condition, the abnormality determination module determines an absence of abnormality in the integrated positioning calculation module output and provides the integrated positioning calculation module output as the abnormality determination module output;
 the abnormality determination module being further configured to determine abnormality of the orientation information in the inertial sensor output which is determined based on the comparison of the position or velocity in the satellite navigation positioning calculation module output from the satellite navigation positioning calculation module with the position or velocity, respectively, in the integrated positioning calculation module output from the integrated positioning calculation module.

2. The satellite navigation/dead-reckoning navigation integrated positioning device of claim 1, wherein the abnormality determination module compares the position and velocity output from the satellite navigation positioning calculation module with the position and velocity output from the integrated positioning calculation module to determine abnormality of the result of the calculation of the integrated positioning calculation module.

3. The satellite navigation/dead-reckoning navigation integrated positioning device of claim 2, comprising a module configured to output the calculation result by the satellite navigation positioning calculation module to a user if the abnormality determination module determines the abnormality.

4. The satellite navigation/dead-reckoning navigation integrated positioning device of claim 1, wherein the integrated positioning calculation module, when resuming the positioning calculation from a state where the positioning calculation is stopped due to the abnormality of the external support data, resumes the integrated positioning calculation using the position and the velocity found by the satellite navigation positioning calculation module as initial values.

5. The satellite navigation/dead-reckoning navigation integrated positioning device of claim 1, wherein the integrated positioning calculation module executes the positioning calculation based on the pseudo range and the Doppler frequency information by a single difference between the satellites found by the tracking processing module.

6. The satellite navigation/dead-reckoning navigation integrated positioning device of claim 5, wherein the integrated positioning calculation module, when resuming the positioning calculation from a state where the positioning calculation is stopped due to the abnormality of the external support data, resumes the integrated positioning calculation using the position and the velocity found by the satellite navigation positioning calculation module as initial values.

7. The satellite navigation/dead-reckoning navigation integrated positioning device of claim 2, wherein the integrated positioning calculation module, when resuming the positioning calculation from a state where the positioning calculation is stopped due to the abnormality of the external support data, resumes the integrated positioning calculation using the position and the velocity found by the satellite navigation positioning calculation module as initial values.

8. The satellite navigation/dead-reckoning navigation integrated positioning device of claim 3, wherein the integrated positioning calculation module, when resuming the positioning calculation from a state where the positioning calculation is stopped due to the abnormality of the external support data, resumes the integrated positioning calculation using the position and the velocity found by the satellite navigation positioning calculation module as initial values.

9. The satellite navigation/dead-reckoning navigation integrated positioning device of claim 7, wherein the integrated positioning calculation module executes the positioning calculation based on the pseudo range and the Doppler frequency information by a single difference between the satellites found by the tracking processing module.

10. The satellite navigation/dead-reckoning navigation integrated positioning device of claim 2, wherein the integrated positioning calculation module executes the positioning calculation based on the pseudo range and the Doppler frequency information by a single difference between the satellites found by the tracking processing module.

11. The satellite navigation/dead-reckoning navigation integrated positioning device of claim 3, wherein the integrated positioning calculation module executes the positioning calculation based on the pseudo range and the Doppler frequency information by a single difference between the satellites found by the tracking processing module.

12. The satellite navigation/dead-reckoning navigation integrated positioning device of claim 4, wherein the integrated positioning calculation module executes the positioning calculation based on the pseudo range and the Doppler frequency information by a single difference between the satellites found by the tracking processing module.

13. A method comprising:
receiving positioning signals of navigation satellites;
tracking the received positioning signals and finding a pseudo range and Doppler frequency information;
calculating correction values pertaining to the navigation satellites;
providing an output from an inertial sensor disposed on the moving body, the output from the inertial sensor including orientation information pertaining to an orientation of the moving body;
performing, by a satellite navigation positioning calculation module on-board the moving body, a positioning calculation based on the correction values, the pseudo range and the Doppler frequency information without external support data from an external device to find a first position and a first velocity of the moving body, and providing a first output including the first position and the first velocity;
finding, by an integrated positioning calculation module disposed on-board the moving body, based on the pseudo range and the Doppler frequency information and based on the external support data, including at least one of the output from the inertial sensor and map position information, obtained from the external device, and the correction values, a second position and a second velocity of the moving body, and providing a second output including the second position and the second velocity; and
comparing the first velocity or the first position of the first output against the second velocity or the second position of the second output, respectively, and determining, based on an outcome of said comparing, whether there is an abnormality in output from the inertial sensor or the map position information included in the external support data from the external device, such that when the comparing indicates a predetermined condition, the determining determines abnormality in the second output and provides the first output as a determined output, and when the comparing fails to indicate the predetermined condition, the determining determines an absence of abnormality in the second output and provides the second output as the determined output;
the determining including determining abnormality of the orientation information in the inertial sensor output which is determined based on the comparison of the position or velocity in the satellite navigation positioning calculation module output from the satellite navigation positioning calculation module with the position or velocity, respectively, in the integrated positioning calculation module output from the integrated positioning calculation module.

14. The satellite navigation/dead-reckoning navigation integrated positioning device of claim 1, wherein
the abnormality determination module is further configured to provide an instruction signal to control a user interface and to modify the instruction signal based on whether the abnormality exists in the output from the inertial sensor or the map position information included in the external support data.

15. The satellite navigation/dead-reckoning navigation integrated positioning device of claim 14, wherein
the abnormality determination module is configured to include information pertaining to the position or velocity, respectively, output from the integrated positioning calculation module in the instruction signal while the abnormality fails to exist and to modify the instruction signal to include information pertaining to the position or velocity output from the satellite navigation positioning calculation module when the abnormality exists.

16. The method of claim 13, further comprising
providing an instruction signal to control a user interface; and modifying the instruction signal based on whether the abnormality exists in the output from the inertial sensor or the map position information included in the external support data.

17. The method of claim 16, wherein
the providing comprises including information pertaining to the position or velocity, respectively, output from the integrated positioning calculation module in the instruction signal while the abnormality fails to exist; and
the modifying modifies the instruction signal to include information pertaining to the position or velocity output from the satellite navigation positioning calculation module when the abnormality exists.

* * * * *